US005311335A

United States Patent [19]

Crabtree

[11] Patent Number: 5,311,335

[45] Date of Patent: May 10, 1994

[54] METHOD FOR GENERATING HOLOGRAPHIC IMAGES

[76] Inventor: Allen F. Crabtree, 359A RR 10, Concord, N.H. 03301

[21] Appl. No.: 840,316

[22] Filed: Feb. 24, 1992

Related U.S. Application Data

[62] Division of Ser. No. 562,271, Aug. 3, 1990, Pat. No. 5,090,789.

[51] Int. Cl.[5] .......................... G03H 1/22; G03H 1/26

[52] U.S. Cl. .......................................... 359/22; 353/10; 359/32; 359/33; 359/858; 362/811

[58] Field of Search ........................ 359/10, 22, 24, 25, 359/28, 32, 33, 857, 858, 859; 352/86; 353/10; 362/811

[56] References Cited

U.S. PATENT DOCUMENTS

| | | | |
|---|---|---|---|
| 3,936,138 | 2/1976 | Noguchi | 359/33 |
| 4,037,919 | 7/1977 | Takeda et al. | 359/28 |
| 4,710,638 | 12/1987 | Wood | 359/858 |
| 4,925,260 | 5/1990 | Fisher et al. | 359/10 |
| 4,983,004 | 1/1991 | Takeya | 359/28 |
| 5,056,880 | 10/1991 | Barbanell | 359/28 |

*Primary Examiner*—Bruce Y. Arnold
*Assistant Examiner*—Martin Lerner
*Attorney, Agent, or Firm*—Gerald E. Linden

[57] ABSTRACT

A laser light show device and method produces a surface projected or suspended holographic image, and includes multiple image projectors. One image projector provides the object image information representing the primary subject. For surface projections, additional background image projectors provide background image information generated using a wobbler plate-reflected beam diffracted through a spherical lens, a beam unidimensionally diffracted through a rotating cylindrical amorphic dipolyhedral lens, and a beam diffracted through multiple diffraction gratings. A suspended holographic image is produced by parabolically focusing multiple images projected onto a spherical image screen.

2 Claims, 4 Drawing Sheets

METHOD FOR GENERATING HOLOGRAPHIC IMAGES

This is a divisional of U.S. application Ser. No. 07/562,271, filed Aug. 3, 1990, now U.S. Pat. No. 5,090,789, issued Feb. 25, 1992.

BACKGROUND OF THE INVENTION

1. Field of the Invention

The present invention relates to a device and method for generating a laser light show, and in particular, a device and method for generating a laser light show having enhanced holographic effects.

2. Description of the Related Art

As the cost and reliability of laser light sources has decreased and increased, respectively, their applications have become increasingly varied and common. One application growing increasingly popular is in the field of entertainment. Laser light sources are being used to create laser light shows, both indoors and outdoors. Indeed, modern concert tours can often be considered disappointing unless a laser light show is included.

Devices for generating laser light shows have suffered and continue to suffer from a number of drawbacks. One drawback is that the devices tend to be rather large and bulky, and therefore difficult to transport. The laser light sources themselves tend to be rather large and bulky, and a series of beam reflectors, e.g. mirrors, and converging means, e.g. lenses, are required to draw the multiple colored laser beams (e.g. red, yellow, green) into close mutual proximity to facilitate their manipulation..

Devices for generating laser light shows typically fail to take advantage of the holography generating capabilities of laser light. Rather, the devices typically will simply use the laser light sources to project brilliantly colored light patterns upon some surface.

Accordingly, a need exists for a laser light show device having an improved design to reduce its size and complexity, and means for advantageously using the laser light to create and enhance holographic imagery.

SUMMARY OF THE INVENTION

A laser light show device in accordance with the present invention has an improved design and layout which reduces its mechanical size and complexity. The present invention advantageously uses the holography generating capability of laser light to produce projected images having enhanced holographic effects. The object image is projected onto a background having up to three types of background images. One type of background image is the projection of a reference beam created by reflecting a laser light beam off a rotating wobbler plate and diffracting the wobbled light beam through a spherical crystal lens.

A second background image is generated by diffracting a laser light beam through a slowly rotating cylindrical amorphic dipolyhedral lens. A third background image is generated by diffracting a laser light beam through two diffraction gratings, wherein one diffraction grating is moving relative to the other.

The present invention uses a novel laser light beam shutter to effectively turn on and off, e.g. modulate, the laser light beam. The invention's shutter consists of a substantially opaque rod mounted and driven to rotate about its longitudinal axis. The rod has a substantially cylindrical hole perpendicular to its longitudinal axis. As the rod spins, the hole becomes alternately concentric and non-concentric with the laser light beam, thereby allowing the laser light beam to pass freely or become effectively blocked.

The present invention provides a means for projecting a suspended holographic image. Multiple laser light beams modulated by object image information are projected equiangularly about the equator of a substantially spherical body having a white periphery with a matte finish. The spherical body is centrally located within one of two opposing parabolic reflectors. The second parabolic reflector has a centrally located aperture through which a holographic image is projected. The holographic image converges just beyond the aperture and just outside the paraboloid formed by the opposing parabolic reflectors.

These and other objects, features and advantages of the present invention will be readily understood upon consideration of the following detailed description of the invention and the accompanying drawings.

BRIEF DESCRIPTION OF THE DRAWINGS

Throughout the figures similar elements are indicated by like numerals.

DETAILED DESCRIPTION OF THE INVENTION

Figure 1A:
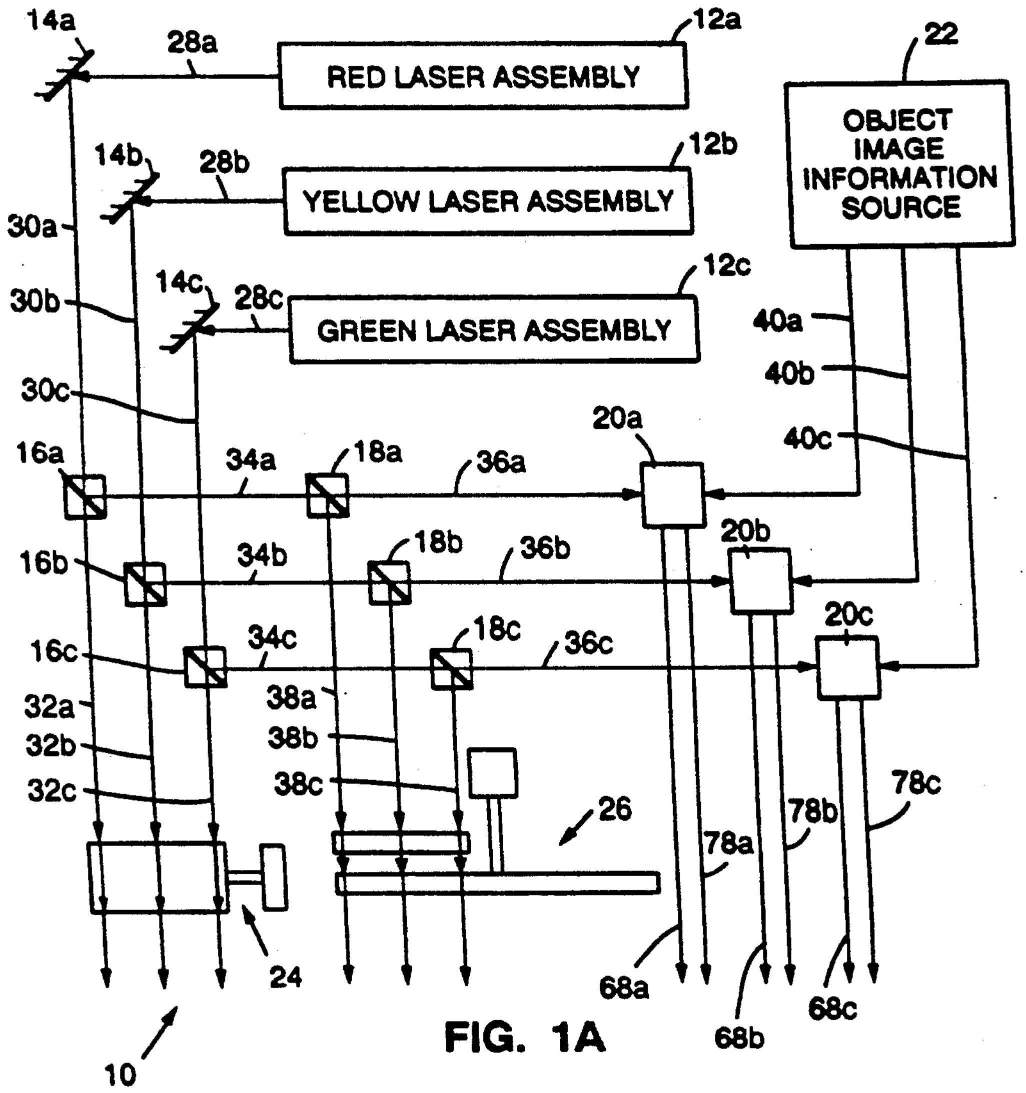
FIG. 1A is a block diagram of a laser light show device in accordance with the present invention.

Referring to FIG. 1A, a laser light show device 10 in accordance with the present invention consists of the following elements, coupled as shown: multiple colored laser assemblies **12*a*–12*c*; dielectric mirrors 14*a*–14*c*; multiple beam splitters 16*a*–16*c*, 18*a*–18*c*; multiple reference and object beam generator assemblies 20*a*–20*c*; an object information source 22; an amorphic dipolyhedral lens assembly 24; and a diffraction gratings assembly 26**.

As shown in FIG. 1A, three laser light assemblies **12*a*–12*c*,** preferably having red, yellow and green laser light sources, are used in a preferred embodiment of the present invention. However, it will be appreciated that any number or colors of laser light sources can be used in accordance with the present invention as described below.

Each laser assembly **12*a*–12*c* emits an incident laser beam 28*a*–28*c* which is reflected off a dielectric mirror 14*a*–14*c*. The reflected laser beams 30*a*–30*c* pass through the first set of beam splitters 16*a*–16*c*, producing secondary incident laser beams 32*a*–32*c* and secondary reflected laser beams 34*a*–34*c*.**

As described more fully below, the secondary incident laser beams **32*a*–32*c* are diffracted through the amorphic dipolyhedral lens assembly 24** prior to projection.

The secondary reflected laser beams 34*a*–34*c* are passed through the second set of beam splitters 18*a*–18*c*, producing tertiary incident laser beams 36*a*–36*c* and tertiary reflected laser beams 38*a*–38*c*. As described more fully below, the tertiary reflected laser beams 38*a*–38*c* are passed through the diffraction gratings assembly 26 prior to projection.

The beam splitters 16*a*–16*c*, 18*a*–18*c* can be selected according to subjective desires regarding the relative beam intensities of the resulting laser beams 32*a*–32*c*, 34*a*–34*c*, 36*a*–36*c*, 38*a*–38*c*. For example, the first beam splitters 16*a*–16*c* can be selected to allow approximately 30% of the intensities of the reflected laser beams 30*a*–30*c* to pass through as the secondary incident laser beams 32*a*–32*c*, with the remaining intensities reflecting as the secondary reflected laser beams 34*a*–34*c*.

The tertiary incident laser beams 36*a*–36*c* are coupled into the reference and object beam generators 20*a*–20*c* for processing prior to projection of the reference 78*a*–78*c* and object 68*a*–68*c* beams. As explained more fully below, object image information signals 40*a*–40*c* from the object image information source 22 are also coupled into the reference and object beam generators 20*a*–20*c* for use in processing the tertiary incident laser beams 36*a*–36*c* prior to projection of the reference 78*a*–78*c* and object 68*a*–68*c* beams.

The object image information signals 40*a*–40*c*, supplied by the object image information source 22, can contain virtually any type of image data. For example, the object image information signals 40*a*–40*c* can represent graphics data, such as that used in an engineering workstation, a video game or medical imaging applications.

As seen in FIG. 1A, the dielectric mirrors 14*a*–14*c* are staggered horizontally so that the incident laser beams 28*a*–28*c* produce reflected laser beams 30*a*–30*c* which are similarly horizontally staggered. By appropriately staggering the dielectric mirrors 14*a*–14*c* horizontally, the reflected laser beams 30*a*–30*c* can be proximally located adjacent to one another at distances on the order of several millimeters. Thus, the horizontal spacing of the reflected laser beams 30*a*–30*c* can be substantially less than the horizontal spacing of the incident laser beams 28*a*–28*c*, which is dictated by the physical dimensions of the laser assemblies 12*a*–12*c* (typically on the order of several inches).

Figure 1B:
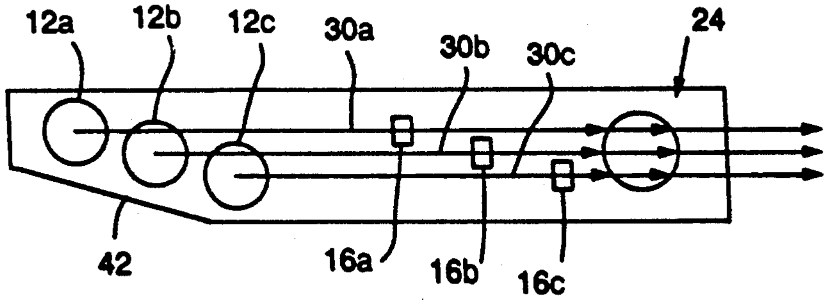
FIG. 1B is a side view of the invention illustrating the mechanical mounting of the laser assemblies.

As shown in FIG. 1B, the laser assemblies 12*a*–12*c* can be mounted along an inclined plane 42. By mounting the laser assemblies 12*a*–12*c* in this fashion, the vertical spacing of the reflected laser beams 30*a*–30*c* can also be established to be on the order of several millimeters. Just as with the horizontal spacing constraints imposed by the physical sizes of the laser assemblies 12*a*–12*c*, the vertical spacing would otherwise be substantially greater.

Therefore, by appropriately staggering the dielectric mirrors 14*a*–14*c* horizontally, and mounting the laser assemblies 12*a*–12*c* along a properly inclined plane 42, the reflected laser beams 30*a*–30*c* can be proximally located adjacent one another as desired.

Figure 2:
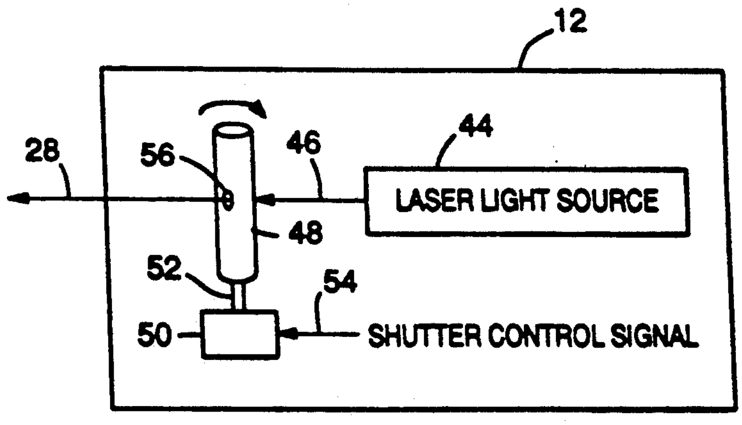
FIG. 2 illustrates a laser light shutter assembly in accordance with the present invention.

Referring to FIG. 2, each laser assembly 12 contains a laser light source 44, which produces an original laser beam 46, and a shutter 48, which is driven by a shutter motor 50 through a coupling shaft 52. As described further below, the shutter motor 50 is controlled by a shutter control signal 54. The original laser beam 46 produced by the laser light source 44 is modulated by the shutter 48 to produce the incident laser beam 28. This modulation is done by rotating the shutter 48. As the shutter 48 rotates, a hole 56 in the shutter, perpendicular to the axis of rotation, alternates between being aligned and non-aligned with the original laser beam 46. When the hole 56 is in alignment with the original laser beam 46, the incident laser beam 28 is produced. This means of modulating the original laser beam 46 produces an incident laser beam 28 which can be effectively turned on and off very quickly.

Figure 3A:
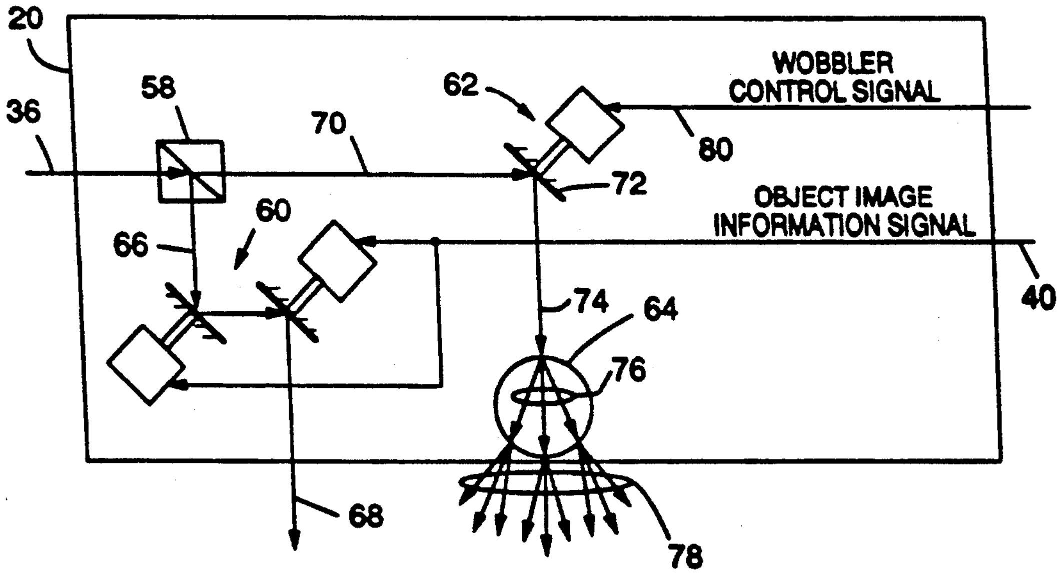
FIG. 3A is a block diagram of the invention's reference and object beam generator.

Referring to FIG. 3A, the reference and object beam generator assembly 20 consists of the following elements, coupled as shown: a beam splitter 58; an x-y scanner assembly 60; a wobbler plate assembly 62; and a spherical lens 64.

The tertiary incident laser beam 36 enters the reference and object beam generator assembly 20 and passes through the beam splitter 58. The reflected beam 66 is reflected through the X-Y scanner assembly 60 to produce the object beam 68 for projection. The X-Y scanner assembly 60 is driven by the object image information signal 40, appropriately scanning, i.e. deflecting, the reflected beam 66 in the X- and Y-directions to product the object beam 68 for projection.

The non-reflected beam 70 exiting the beam splitter 58 is reflected off a wobbler plate assembly 62. The dielectric mirror 72 of the wobbler plate assembly 62 rotates in a non-planar manner. The non-reflected beam 70 strikes the wobbling mirror 72 slightly off center, thereby striking a wobbling mirror surface. This produces a wobbling reflected beam 74 which spins conically about a central axis.

Figure 3B:
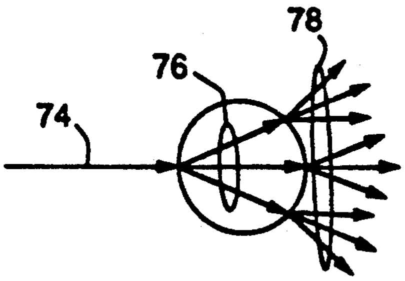
FIG. 3B illustrates the double hemispherical diffraction produced by a spherical lens in accordance with the present invention.

The wobbling beam 74 is passed through the spherical lens 64 to produce a singly hemispherically diffracted beam 76 and then a doubly hemispherically diffracted beam 78. As shown in FIGS. 3A and 3B, the single and double diffraction patterns are hemispherical in the sense that the diffraction patterns extend in both the vertical and horizontal directions.

In a preferred embodiment, the spherical lens 64 is constructed of substantially optically pure quartz crystal. The latticed structure of the quartz crystal enhances the regularity and uniformity of the diffraction properties of the spherical lens 64. This results in more uniform hemispherically diffracted beams 76, 78.

Both the object image beam 68 and reference image beam 78 are projected together. When so projected, the reference image beam 78 serves as a dim background providing a sensation of parallax, while the object image beam 68 provides the subject image. The overall holographic effect can be enhanced by selectively synchronizing the wobbler control signal 80 with the shutter control signal 54.

By selectively controlling the rotational speed of the wobbling dielectric mirror 72, relative to the rotational speed of the shutter 48, the relative wobbling circular motion of the wobbling beam 74, relative to the on-off modulation of the incident laser beam 28, and therefore the non-reflected beam 70, produces a reference image beam 78 having variable stasis. By varying the relative rotational speeds of the wobbling mirror 72 and shutter 48, the reference beam 78 can be selectively provided with negative stasis, wherein the reference beam pattern appears to rotate counterclockwise, or positive stasis, wherein the reference beam pattern tends to rotate clockwise. This produces an overall effect of making the projected object image appear to recede or approach the viewer.

Another X-Y scanner (not shown) can be used in line with the non-reflected beam 70. By "averaging" the object image information signal 40, the X-Y, i.e. planar, center of the object image can be represented. Such an "averaged" object image information signal can then be used to drive the X-Y scanner for the non-reflected beam 70. This would produce a wobbling beam 74, and therefore a reference beam 78, which projects a reference image which is substantially centered about the projected object image.

Figure 4A:
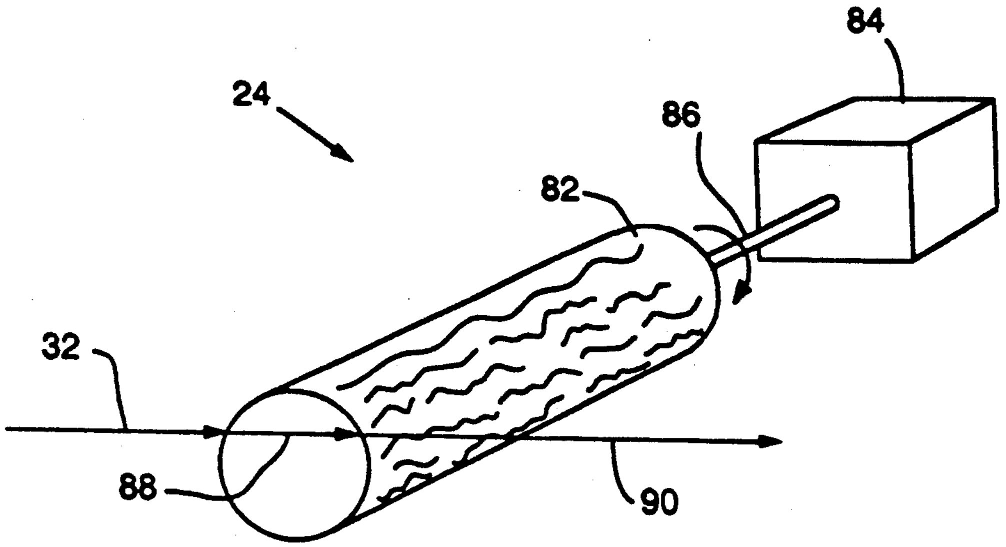
FIGS. 4A-4B illustrate the invention's amorphic dipolyhedral lens assembly.
Figure 4B:
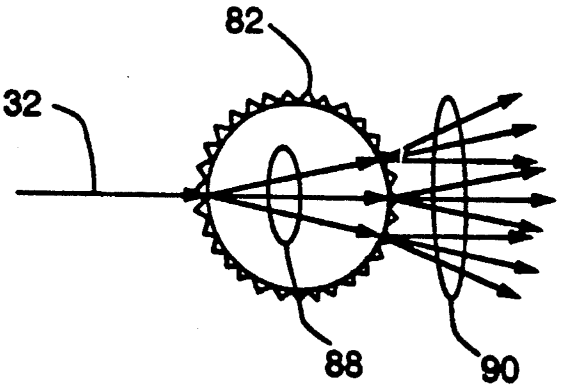

Further projected background image information can be provided by using the amorphic dipolyhedral lens assembly 24, as shown in FIGS. 4A–4B. The lens assembly 24 consists of an amorphic dipolyhedral lens 82 rotated by a motor 84 via a shaft 86. The rotational speed of the lens 82 can be set at any speed subjectively deemed desirable, based upon the visual effect produced. The secondary incident laser beam 32 enters the lens 82, producing a singly vertically diffracted beam 88. The singly vertically diffracted beam 88, exits the lens 82, producing a doubly vertically diffracted beam 90. FIG. 4B illustrates this vertical diffraction in more detail.

The amorphic dipolyhedral lens 82 is a hollow cylinder constructed of glass with irregular longitudinal protrusions, e.g. knurls, about its periphery. In a preferred embodiment, glass is preferred over crystal to take advantage of the non-latticed structure of glass. This non-latticed structure, in conjunction with the longitudinal outer surface irregularities, enhance the amorphic diffraction properties of the lens 82. An experimental version of the lens 82 was constructed from an empty Finlandia® vodka bottle.

Figure 5:
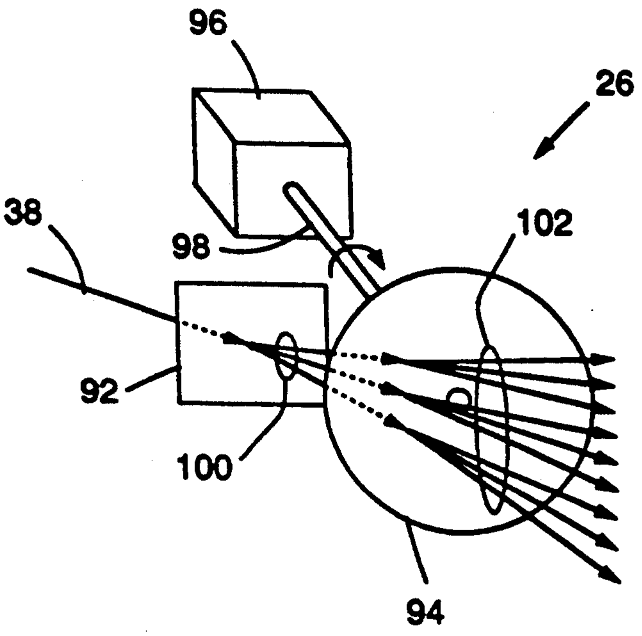
FIG. 5 illustrates the invention's diffraction gratings assembly.

Still further background image information can be projected to further enhance the holographic effect of the laser light show device in accordance with the present invention. Such additional background image information can be provided with the diffraction gratings assembly 26. Referring to FIG. 5, the tertiary reflected laser beam 38 first passes through a fixed diffraction grating 92. This produces a singly diffracted beam 100, which is passed through a rotating diffraction grating 94, producing a doubly diffracted beam 102. The rotating diffraction grating 94 is rotated by a motor 96 via a shaft 98.

In an alternative embodiment, the first diffraction grating 92 can also be rotated, either in a direction counter to that of the rotational direction of the first rotating diffraction grating 94, or in the same direction but at a different speed. This double diffraction of the laser beam 38 through multiple diffraction gratings moving relative to one another produces a background image beam 102 which imparts a further sensation of motion which enhances the holographic effect of the displayed object image.

Figure 6:
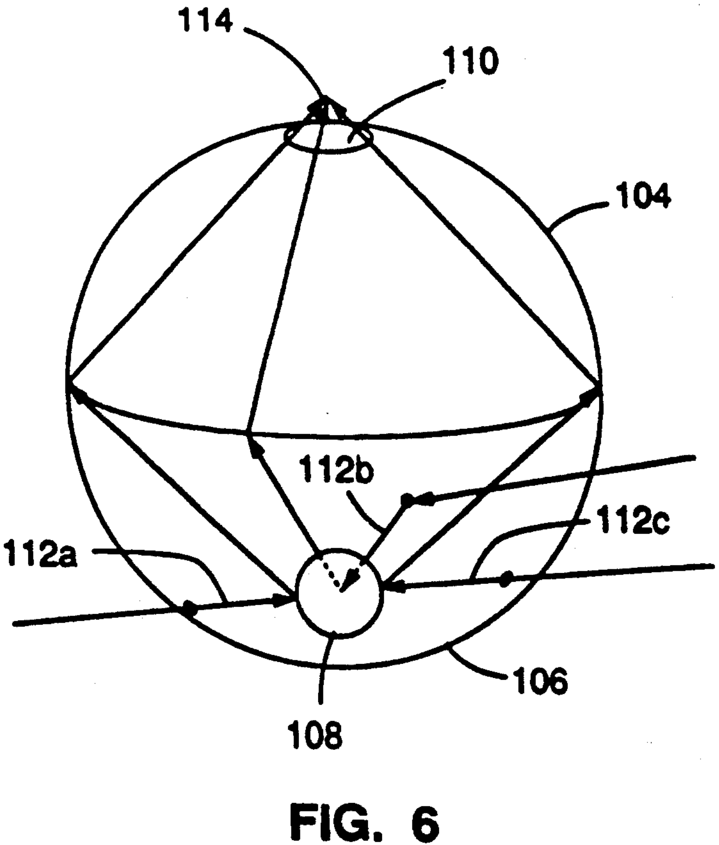
FIG. 6 illustrates the invention's holographic suspension projector.

As stated above, the background and object image information need not be projected onto a surface, but can instead be projected to produce a suspended holographic image. This can be accomplished by using a holographic suspension projector as shown in FIG. 6.

Top and bottom opposing concave reflective saucers 104, 106, preferably parabolic reflectors, are used. Centrally located within the bottom reflector 106, is a substantially spherical image reflector 108. The image reflector 108 should have a substantially white surface with a matte, i.e. not glossy, finish. For example, a white plastic material can be used, however, a white ceramic material will produce a better image.

Centrally disposed within the top reflector 104 is an aperture 110. Object image information modulated onto multiple laser beams **112*a*–112*c* is projected substantially equiangularly about the equator of and onto the image reflector 108. The multiple images thereby produced on the image reflector 108 are reflected within the parabolic reflectors 104, 106 and converge at a point 114 just beyond the aperture 110. This converging image information produces a holographic image which appears to be suspended just above the aperture 110**.

The object image information modulating each of the laser beams **112*a*–112*c* can be identical, thereby producing a suspended holographic image which appears substantially identically regardless of the horizontal viewing perspective. Alternatively, the object image formation modulating each of the laser beams 112*a*–112*c*** can represent different views of the same subject, thereby producing a suspended holographic image which appears to be three-dimensional as the horizontal viewing perspective changes.

It should be understood that various alternatives to the embodiments of the present invention described herein can be employed in practicing the present invention. It is intended that the following claims define the scope of the present invention and that structures and methods within the scope of these claims and their equivalents be covered thereby.

What is claimed is:

1. A method for generating holographic images, comprising the steps of:

modulating a plurality of laser light beams with image information;

projecting said modulated laser light beams substantially equiangularly about the equator of and onto a substantially spherical image reflector;

reflecting images from said image reflector off of a first concave reflector having an apex disposed substantially opposite a first pole of said image reflector; and converging said image reflections at a point substantially opposite a second pole of said image reflector.

2. A method as recited in claim 1, further comprising the step of reflecting images from said image reflector off of a second concave reflector having an apertured apex disposed substantially opposite said second pole of said image reflector.

* * * * *